Feb. 12, 1946.  A. F. HICKMAN  2,394,548
SPRING SUSPENSION FOR RAILROAD CARS
Filed Aug. 4, 1943  4 Sheets-Sheet 1

Patented Feb. 12, 1946

2,394,548

UNITED STATES PATENT OFFICE 2,394,548

SPRING SUSPENSION FOR RAILROAD CARS

Albert F. Hickman, Eden, N. Y., assignor to Hickman Pneumatic Seat Co. Inc., Eden, N. Y., a corporation of New York Application August 4, 1943, Serial No. 497,316

18 Claims. (Cl. 105—182)

This invention relates to a spring suspension for railroad cars and is more particularly shown as embodied in the truck of a freight car, although features of the invention are also applicable to passenger car suspensions.

It is one of the objects of the present invention to provide a spring suspension which will function to safely support the car body at high speeds, both when loaded and unloaded, higher speeds being demanded of freight trains.

Another object of the invention is to provide such a suspension in which torsion rods are used in place of the usual bolster springs and in such manner as to provide a longer and a variable spring resistance range within the limited space available in a conventional freight car truck.

Another object is to provide such a truck and suspension which is self-contained and which comprises short, simple torsion rods functioning through a simple lever and link arrangement to provide the vertical resiliency and the force of gravity acting through this same linkage to provide the lateral resiliency.

Another object of the invention is to provide a spring suspension which provides for the lateral cushioning of the car body as well as its vertical cushioning, thereby to absorb lateral impacts imposed upon the car body as well as vertical impacts.

Another object is to provide such a suspension which can be assembled in large quantities in one central plant and sold as a complete unit.

Another aim is to provide a railroad truck having such a spring suspension in which all parts are well within the limits of size and movement required by present railroad standards.

Another object is to provide such a spring suspension which provides the necessary stability under all conditions of operation and also provides the desired non-destructive riding qualities.

Another object is to provide a truck and spring suspension for railroad cars which is light in weight and is also adapted to be used in conjunction with lightweight bodies and equipment, such lightweight bodies and equipment being desirable with the use of increased rail speeds.

Another object is to provide such a spring suspension which incorporates standard wheels, axles and anti-friction bearings.

Another object of the invention is to provide such a suspension which will support the car body in such manner as to permit a minimum side sway even with the high centers of gravity of conventional railroad freight car bodies.

Another object of the invention is to provide such a spring suspension having many operating economies, such as the saving in fuel; the saving in wear on the tracks and the wheels; and the saving in maintenance of the car bodies, trucks and spring suspensions.

Another object of the invention is to provide such a suspension in which the friction of the spring suspension can be reduced to any desired degree to provide the desired ride and stability and so that the stress upon the torsion rods is held low enough to insure long life and freedom from the danger of breakage.

Another object is to provide such a spring suspension which is easily taken down and in which each entire axle assembly can readily be removed and replaced from the truck.

Another aim is to provide such a railroad suspension which will operate a year or more between lubrication intervals.

Another object is to reduce the unsprung weight of the truck, both vertically and laterally, to the wheels, axles and journal boxes.

Another purpose is to provide such a suspension which eliminates wheel hop and wheel tramp.

Another object is to provide a spring suspension in which any desired frequency or degree of spring deflection can be obtained.

Another purpose of the invention is to provide a suspension in which auxiliary devices for the control of sidesway are rendered unnecessary.

Another object of the invention is to provide a suspension having two brake shoes per wheel for high speed operation and in which a simple and efficient means is provided for keeping the brake shoes in proper alinement with the wheels of the truck and at the same time permit the laterally cushioned movement thereof.

Another aim is to provide such a suspension which will function properly under extreme climatic conditions and will adequately resist the effects of the corrosion, ice, grit and dirt jamming encountered in extreme railroad operating conditions.

A further object of the invention is to provide such a suspension which is extremely compact and which will stand up under conditions of severe and constant use with little servicing.

Other objects and advantages will be readily apparent from the following description and accompanying drawings, wherein.

The invention is illustrated as embodied in a swivel truck on the frame 10 of which the car body (not shown) is mounted by means of a center bearing 12. The truck frame 10 is shown as supported on four flanged railroad wheels 14 which are fast to axles 15 of standard construction and ride upon the rails 16 of the railroad track. The ends of the axles project beyond the wheels and are journaled in journal boxes 18, the truck frame being supported on these journal boxes 18 through the spring suspension embodying the present invention. The freight car body (not shown) is supported at each end on a swivel truck as shown so that each truck supports half the weight of the car body. It will also be understood that while a four wheel truck is shown, the invention can be embodied in a six wheel truck.

Figure 1:
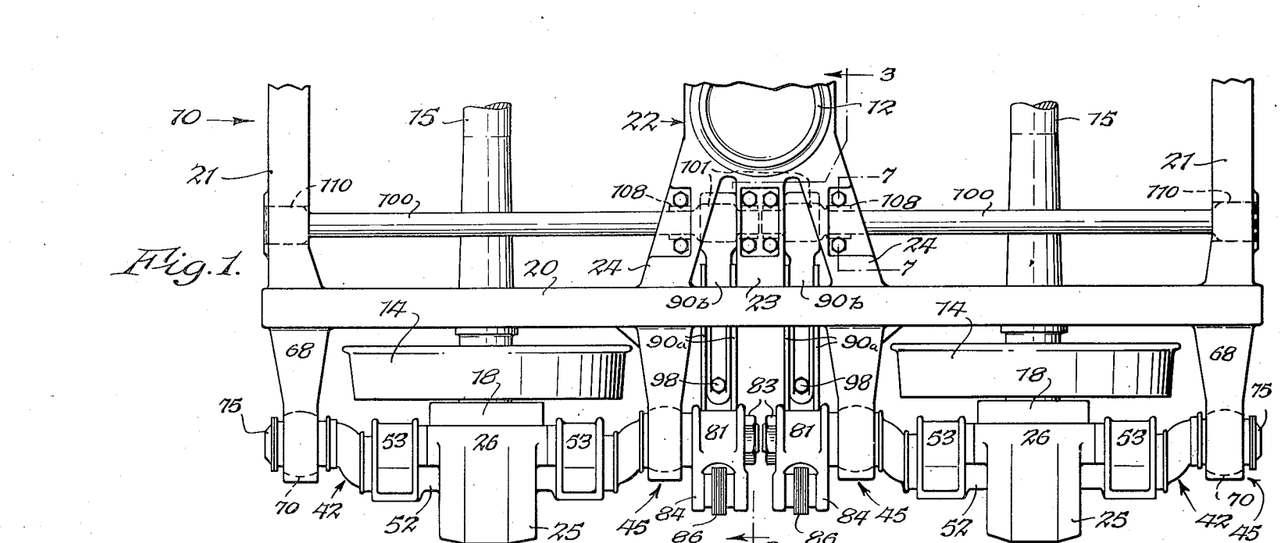
Fig. 1 is a fragmentary top plan view of a truck for a railroad freight car body embodying my invention.

The truck frame 10 is shown as made of a single steel casting, although any suitable type of truck frame construction can be employed. The truck frame is shown as comprising two longitudinal side beams 20 which are box-shaped in cross section, these side beams being raised or arched upwardly slightly above each axle 15. These side beams 20 are rigidly connected at their ends by integral transverse end beams 21 and also by an integral center cross beam structure 22 which carries the center bearing 12. As best shown in Fig. 1, the central part of this center structure which carries the center bearing 12 is connected with each longitudinal side beam 20 by three beams, the central one 23 of these beams being flanked by two side beams 24 which are shown as diverging outwardly toward the longitudinal side beams 20.

Figure 4:
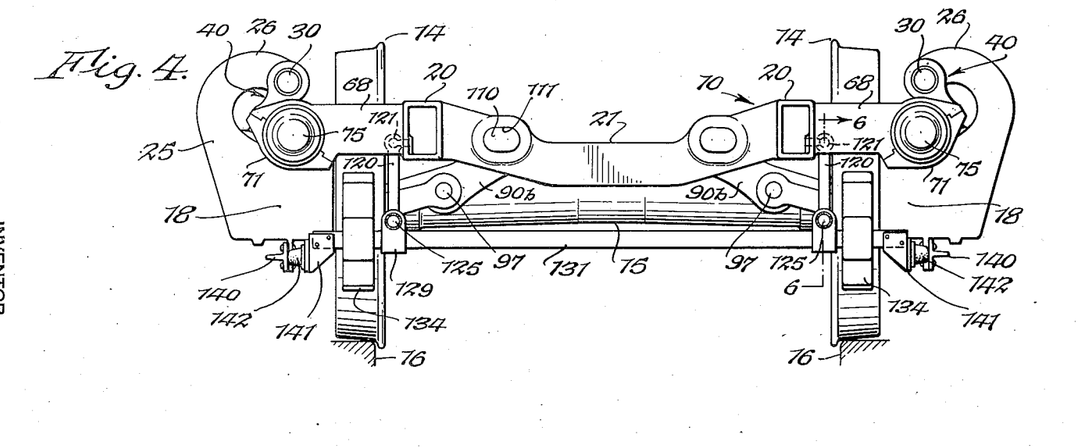
Fig. 4 is an end elevational view thereof with the brake mechanism included.
Figure 5:
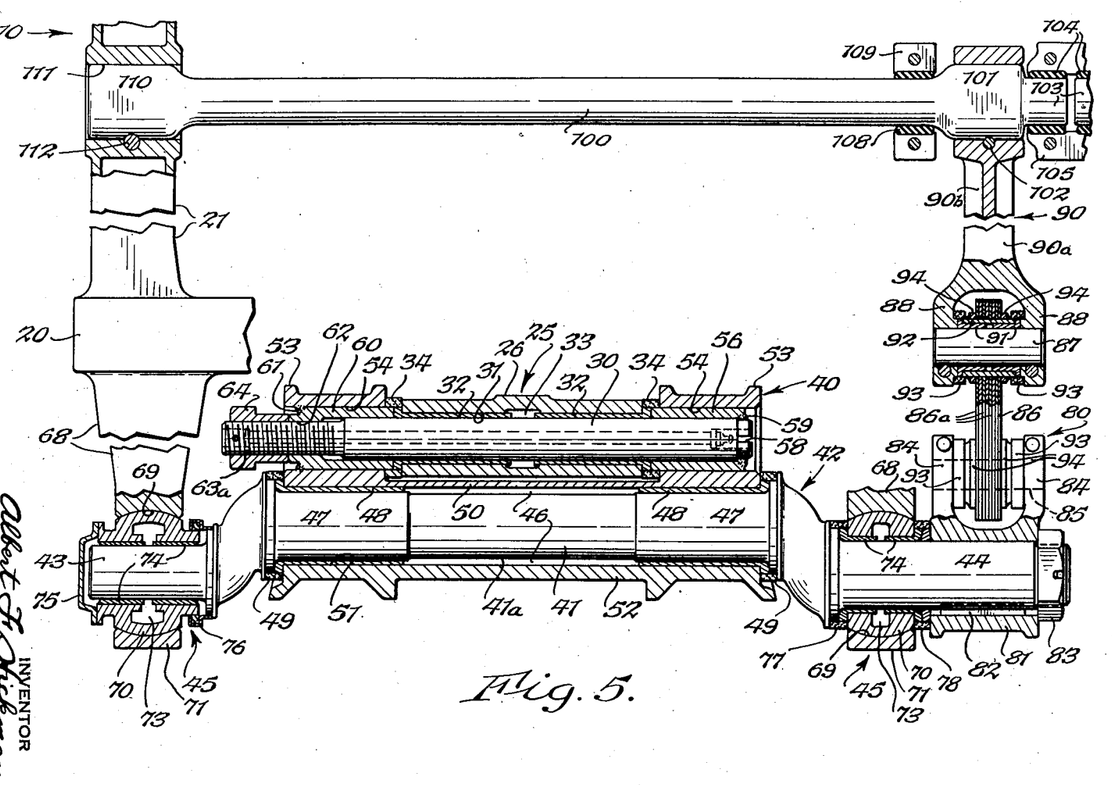
Fig. 5 is a laid out section of a torsion rod secured to the truck frame and the linkage connecting the live end of this torsion rod to the end of a corresponding axle, this section being taken generally on line 5—5, Fig. 3.

Formed integrally with each journal box 18 is an axle bracket 25 which extends outwardly and upwardly from the journal box 18, as best shown in Fig. 4, and the upper end of each axle bracket being of gooseneck form, its extreme upper end 26 curving inwardly and downwardly and supporting an axle pivot pin 30 which is journaled at its extreme depressed end. For this purpose, as best shown in Fig. 5, the extreme end of the axle bracket 26 is provided with a horizontal bore 31 extending transversely of the axle and flanged bearing bushings 32 are inserted into the opposite ends of this bore and carry the axle pivot pin 30. At its center the bore 31 in the extremity of the axle bracket 25 is enlarged to provide a lubricant reservoir 33. These bearings, as with the other bearing bushings, are preferably of such a size that the maximum static loads on the bearings are kept down to a range between 250 to 500 pounds per square inch. With such low bearing loading it is possible to use bearing bushings requiring no lubrication other than lubrication built into the bearing metal. It is also possible to use a pressure system feed operating from a central lubricant pressure unit thereby to provide only one point on each truck to lubricate and that only annually. Another means for increasing the lubrication intervals is the provision of large lubricant reservoirs, such as the lubricant reservoir 33, together with good oil seals, such as the oil seals 34 at the end flanges of the bearing bushings 32.

The opposite ends of each axle pivot pin 30 project outwardly from the axle bracket 25 in which it is journaled and the opposite ends of each axle pivot pin 30 are secured by a shackle or link 40 with the offset central part or crank 41 of a crank or eccentric shaft 42, the opposite ends 43, 44 of this eccentric or crank shaft being journaled in bearings 45 carried by the truck frame. For this purpose the offset central part or crank 41 of the crank or eccentric shaft 42 is provided with a central reduced part 41a which forms a lubricant reservoir 46 and on opposite sides of this central reduced part 41a it is formed to provide cylindrical bearing surfaces 47. Each of these cylindrical bearing surfaces 47 of the crank or eccentric shaft 42 is engaged by a pair of mating semi-cylindrical flanged bearing bushings 48, the ends of each pair of which are provided with an oil seal 49.

The shackle or link 40 is formed to provide an elongated semi-cylindrical portion 50 having a semi-cylindrical bore 51 which embraces the bearing bushings 48 at both ends of the eccentric or crank shaft 42 and the link 40 is secured to these bearing bushings 48 by a semi-cylindrical cap 52 which embraces the other halves of the bearing bushings 48 and can be secured to the semi-cylindrical portion 50 of the link 40 in any suitable manner. The opposite ends of the semi-cylindrical portion 50 of the shackle or link 40 is formed to provide a pair of extensions 53 which, in the normal condition of the suspension, extend upwardly and inwardly therefrom and are provided with bores 54 which embrace the projecting ends of the axle pivot pin 30. A sleeve 56 is fitted in one of these bores 54 of the link 40 and around the corresponding end of the axle pivot pin 30 which is shown as being slotted as indicated at 58. This sleeve is shown as welded to the slotted end of the axle pivot pin 30, as indicated at 59, and as fitted against the flange of the adjacent bearing bushing 32. A second sleeve 60 is fitted in the opposite bore 54 of the shackle or link 40 around the axle pivot pin 30 and is shown as being welded to the bore 54 of the shackle or link 40, as indicated at 61. This sleeve 60 is shown as having one end of its bore reduced and threaded, as indicated at 62, to receive a reduced threaded end 63a of the axle pivot pin 30, this reduced threaded end 63 of the axle pivot pin 30 also carrying a lock nut 64 which screws against the end of the sleeve 60. It will be seen that upon removing the lock nut 64, the axle pivot pin can readily be unscrewed from the sleeve 60 and removed from the assembly thereby permitting the bearing sleeves 32 to be exposed for removal. Upon replacing the parts, the axle pivot pin can be screwed into the sleeve 60 to obtain the proper endwise pressure between the two sleeves 56 and 60 against the bearing bushings 32, following which the lock nut 64 can be replaced to preserve this adjustment.

The frame bearings 45 for supporting the extremities 43, 44 of the eccentric or crank shaft 42 are each shown as carried by a bracket 68 which projects horizontally outward from the corresponding longitudinal side beam 20 of the truck frame and is formed at its outer end with a semi-spherical socket 69 to receive a ball member 70, this ball member being retained in the semi-spherical socket 69 by a cap 71 having a semi-spherical socket fitting the other half of the ball member 70 and secured to the bracket 68 in any suitable manner. This member 70 is shown as provided with horizontal end bores leading to an annular lubricant reservoir 73 and in each of these end bores is fitted a bearing bushing 74 in which the corresponding extremity of the eccentric or crank arm 42 is journaled. The end 43 of the eccentric or crank arm 42 is enclosed by a cap 75 secured to the corresponding ball member 70 and oil seals 76, 77 and 78 are provided to prevent leakage at the remaining exposed ends of the bearing bushings 74.

The other cylindrical extremity 44 of the eccentric or crank shaft 42 projects beyond the adjacent frame bearing 45 and has fastened thereto a crank arm 80. This crank arm is shown as comprising a hub 81 which is fitted over and keyed, as indicated at 82, to the end 44 of the eccentric or crank shaft 42 and held thereon by a nut 83 on the extremity of the end 44 of the eccentric or crank shaft 42. The crank arm 80 is shown as bifurcated, the two bifurcations 84 thereof carrying a crank arm pivot pin 85 on which the upper end of a laminated link or shackle 86 is pivoted. The lower end of this laminated link or shackle 86 is journaled on a lever arm crank pin 87 carried by the bifurcated ends 88 of a two piece lever arm 90 and since the bearings at the upper and lower ends of the laminated link or shackle 86 are the same, a description of one will be deemed to apply to both.

As best shown in Fig. 5, the lever arm pivot pin 87 is fixed in alining bores provided in the bifurcations 88 of the lever arm 90 in any suitable manner and is carried by a pair of flanged bearing bushings 91 which in turn are carried by a sleeve 92, oil seals 93 being provided around the flanges of the bearing bushings 91 and the adjacent parts of the sleeve 92 and bifurcations 88. To the sleeve 92 is welded a pair of rings 94 which bear against opposite sides of the laminated link or shackle 86, this shackle being composed of a series of laminations 86a. The bearing between the upper end of the laminated link or shackle 86 and the pin 85 is identical in construction and hence the same reference numerals have been employed.

Figure 3:
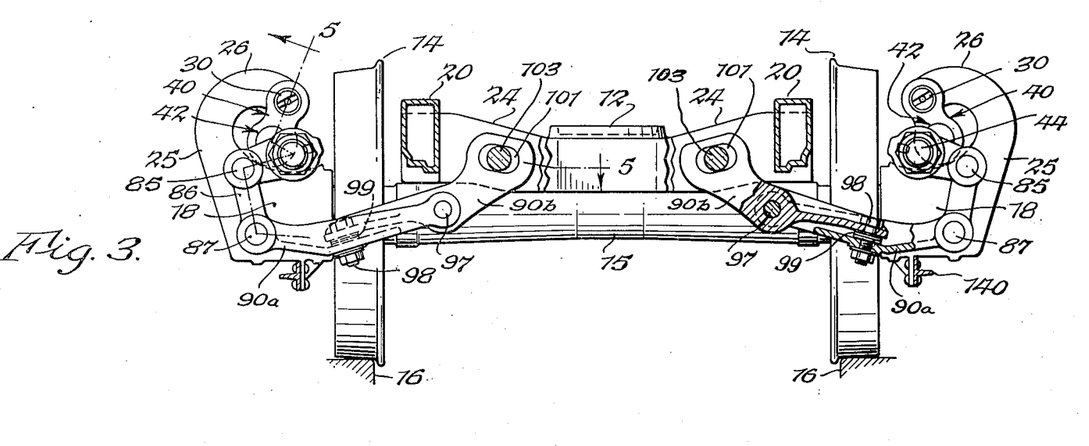
Fig. 3 is a vertical transverse section, taken generally on line 3—3, Fig. 1, the brake mechanism being left out of this view for clarity.

The lever arm 90 is a jointed lever arm comprising two sections 90a and 90b. As best shown in Fig. 3, the outer section, which carries the lever arm pivot pin 87, is channel-shaped in cross section and its side walls or flanges 96 are extended inwardly to embrace the inner section 90b of the lever arm, the inner extremities of these side walls or flanges 96 being connected to the central part of the lever arm section 90b by a horizontal pivot pin 97. The outer extremity of the inner section 90b of the lever arm lies within the channel of the outer section 90a thereof and is connected to the bottom web or cross part of the outer section 90a by a bolt 98. A plurality of washers 99, acting as shims, are arranged around each bolt 98 between the outer extremity of the inner section 90b of the lever arm and the outer section 90a thereof and it will therefore be seen that by increasing or decreasing the number of washers 99, the effective height of the outer extremity of the jointed lever arm can be raised or lowered. This permits of adjusting the effect of the spring suspension as will be later seen.

Figure 7:
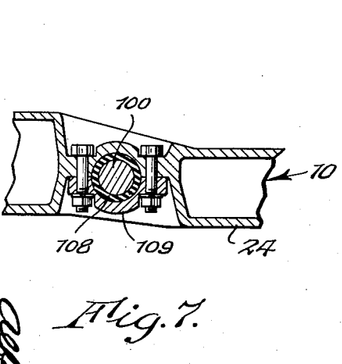
Fig. 7 is an enlarged fragmentary vertical transverse section, taken on line 7—7, Fig. 1.

The composite or jointed lever arms 90 are carried by the live ends of torsion rods 100. For this purpose the live end 101 of each of the torsion rods is shown as ovalled in the manner described and claimed in my Patent No. 2,213,004, granted August 27, 1940, and the inner extremity of the inner section 90b of each lever arm 90 is provided with an oval bore which fits the ovalled live end 101 and is held thereon by a pin 102. The live end 101 of each torsion rod is journaled on the truck frame and for this purpose the live end 101 of each torsion rod, as best shown in Fig. 5, is provided with a cylindrical extension 103 which fits into a bushing 104 of rubber or other soft resilient plastic material, this bushing being secured in a recess on the underside of the corresponding central bar 23 of the central transverse structure of the truck frame by a half bearing cap 105. It will be noted that the same half bearing block or cap 105 carries rubber bushings 104 for the opposing live ends of two torsion rods, the torsion rods for the axle ends at each side of the truck frame being axially in line with each other. On the opposite side of the ovalled live end 101 of each torsion rod, the shank or shaft of the torsion rod is journaled in a rubber bushing 108 held as best shown in Figs. 5 and 7, in a recess in the underside of the corresponding side bar 24 of the center structure of the truck frame by a half bearing block or cap 109. By this means the ovalled live end 101 of each torsion rod 100 is securely journaled on its opposite sides in frame bearings, these frame bearings requiring no lubrication since the bearing is provided by the inherent resilience of the rubber bushings.

The dead end 110 of each torsion rod is also ovalled in the manner shown in my said Patent No. 2,213,004 and is fitted in an ovalled bore 111 provided in the corresponding end of the corresponding transverse end bar 21 of the truck frame, these ovalled dead ends 110 being retained in these ovalled bores 111 by pins 112 or in any other suitable manner.

It will therefore be seen that the torsion rods 100 extend parallel with and alongside the longitudinal side beams 20 of the truck frame; that their opposing live ends are journaled in frame bearings provided at the center of the truck frame; that their dead ends are anchored in the transverse end bars 21 of the truck frame and that the live end of each torsion rod is connected with the end of a corresponding axle by the linkage described.

Figures 6, 8:
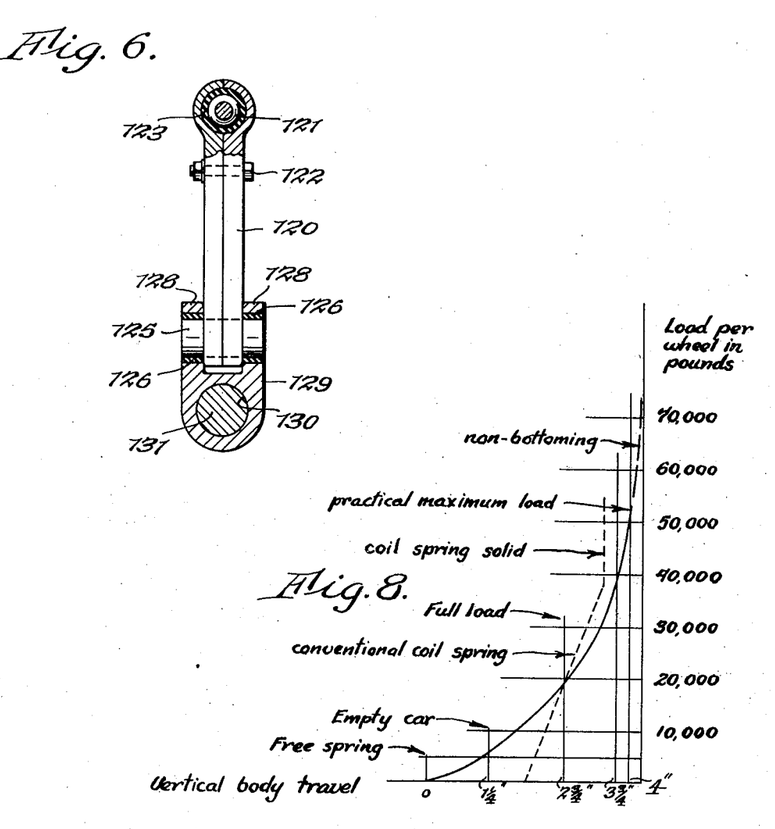
Fig. 6 is an enlarged fragmentary vertical longitudinal section, taken on line 6—6, Fig. 4, through one of the brake hangers.
Fig. 8 is a graph showing the spring deflection curve of the suspension embodying the invention.

A pair of clasp brakes is shown as provided for each railroad wheel 14 to provide adequate braking at high speeds. For this purpose a pair of brake shoe hangers 120 are secured to the outside of the longitudinal side beams 20 of the truck frame on opposite sides of each of the railroad wheels 14. A spherical knob 121, as best shown in Figs. 4 and 6, is secured to the outer side of the longitudinal side beams 20 of the truck frame on opposite sides of each railroad wheel 14 and each brake hanger 120 is made of two halves secured together by bolts 122 and jointly forming a spherical socket at their upper ends in which the corresponding knob 121 is arranged, a spherical bushing 123 of rubber or other soft resilient plastic material being compressed around each knob 121 by the halves of the corresponding hanger 120 so that a universal mounting is provided for suspending each brake shoe hanger 120 from the truck frame.

At its lower end each brake shoe hanger 120 carries a pin 125 which extends fore and aft from the hanger and carries a rubber bushing 126 at each end. These rubber bushings 126 of each brake shoe hanger are embraced by ears 128 of a fitting 129 provided with a bore 130. In the bores 130 of the pair of fittings 129 on the corresponding side of each axle is arranged a rod 131 which, as best shown in Fig. 4, extends transversely under the truck frame and each outboard end carrying a brake shoe 134. The pair of brake shoes 134 carried by each rod 131 conform to the spacing of the corresponding pair of railroad wheels 14 so that when the pair of rods 131 on opposite sides of each axle are drawn together by any suitable brake mechanism (not shown) the brake shoes 134 will engage the peripheries or tires of the railroad wheels 14.

Figure 2:
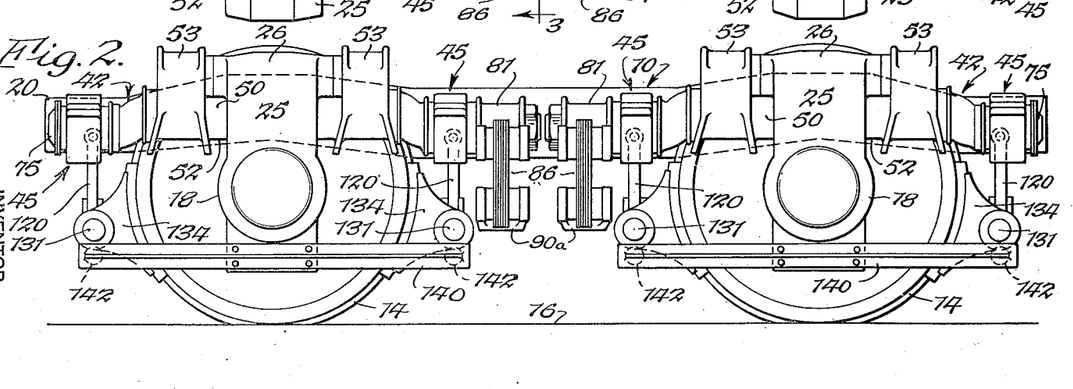
Fig. 2 is a side elevation thereof.

Since the suspension as above described permits lateral or endwise movement of the axles relative to the truck frame, it will be seen that the rods 131 together with the brake shoes 134 mounted thereon must be made to track or follow the lateral axle movement since otherwise these brake shoes would not be in register with the railroad wheels 14 when moved to effect braking. To secure this tracking of the brake shoes, a horizontal bar 140, as shown in Fig. 2, is secured to the lower part of each journal box 18 and as extending fore-and-aft therefrom transversely of the corresponding axle so that each end of each bar 140 is generally in line with the corresponding pair of rods 131 which carry the brake shoes 134. The inner face of each of the bars 140 is flat and on the end of each of the rods 131 is mounted a fitting 141 and which, as best shown in Fig. 4, carries a resilient bumper 142 which engages the flat inner face of the corresponding bar 140. It will be seen that as each axle 15 moves laterally in one direction or the other relative to the truck frame, the bars 140 associated with this axle bear against the corresponding bumpers 142 and shift the rod 131 accordingly, the hangers 120 supporting this rod 131 permitting such movement with reference to the truck frame. Since the brake shoes 134 are fast to these rods 131, it will be seen that these brake shoes are thereby always maintained in proper register with the peripheries of the railroad wheels 14 to effect a proper braking action.

Operation

In railroad service distinctly different types of rides are required in freight and passenger cars. In freight service the loads vary as much as 300% and the prime consideration is to provide a non-destructive ride to the merchandise carried with the maximum safety and stability of the cars, both loaded and unloaded at high speeds, and to reduce the power required for hauling to the lowest possible minimum. In a freight vehicle, the frequency of the suspension need not be very low but the friction in the suspension should be reduced as low as possible consistent with stability and safety. In order to reduce propelling power to a minimum the spring suspension should provide ample resiliency to the body and load of the vehicle, both vertically and laterally, against shocks and sharp quick movements of the wheels and axles. Spring suspensions in railroad freight trucks further call for a high variable rate suspension to accommodate the great variation in loads, particularly with the very limited vehicle movement of the car body which is allowed by present day standards. In common with passenger car suspensions, where the load variation is low and comfort calls for a low frequency, a freight car suspension should be designed to provide the maximum safety, economy, durability and riding qualities and still be economical to manufacture and maintain.

In the operation of the suspension, the upward movement of the end of any axle 15 effects, through the corresponding axle pivot pin 30 and shackle or link 40, an upward movement of the offset central part or crank 41 of the eccentric or crank shaft 42. This eccentric or crank shaft is journaled on the truck frame by the bearings 45 and the oscillation caused by the upward movement of its crank 41 effects an upward movement of the crank arm 80 fast to one end thereof. This upward movement effects an upward movement of the corresponding laminated link or shackle 86, this effecting an upward movement of the attached two piece lever arm 90. The inner end of this two piece lever arm 90 is fast to the ovalled live end 101 of a torsion rod 100 and since this ovalled live end of this torsion rod is journalled on the truck frame in a pair of rubber bushed bearings 104 and 108, it will be seen that the torsion rod 100 provides the resilient resistance to the assumed upward movement of its associate axle end, the opposite ovalled dead end 110 of this torsion rod being anchored in the truck frame.

The effectiveness of any torsion rod in providing the resilient resistance to the upward movement of the corresponding axle end, or, conversely, the downward movement of the corresponding corner of the truck frame, can readily be adjusted by removing the bolt 98 which holds the two sections 90a and 90b of the two piece or jointed lever arm 90 together, and inserting or removing enough shims 99 to secure the desired results.

Should any axle 15 or its wheels 14 require repair or replacement, the entire axle assembly can be readily removed, this merely requiring unscrewing the lock nuts 64 of the corresponding pair of axle pivot pins 30, this permitting these axle pivot pins 30 to be unscrewed from the threaded sleeves 60 and withdrawn, the axle assembly being thereby disconnected from the suspension for repair.

It will be seen that when the end of the axle is so forced upwardly relative to the truck frame (or vice versa when the truck frame is forced downwardly relative to the axle and the influence of momentum) the effective resilient opposing force of the corresponding torsion rod 100 increases at a geometric and not an arithmetic rate so as to provide a variable resistance, the resistance of each torsion rod being shown on the graph, Fig. 8, in which the load per wheel in pounds, is plotted against vertical body travel in inches, the full line curve showing the action with the suspension embodying the present invention and the dotted line curve showing the action of conventional coil springs as now used in railroad car suspensions.

It will be noted that this geometric rate is of the accelerated increased type in which increments of vertical movements of the axle are opposed by an accelerated rate of resilient resistance. This is primarily due to the progressive decrease in the effective length of the offset portions or cranks 41 of the eccentric or crank shaft 42 and the crank arms 80 as these cranks and lever arms swing upwardly and inwardly about their axis of rotation. This action is also influenced by the varying angularity of the shackles or links 40. This geometric action also occurs when the end of the axle moves downwardly relative to the truck frame from the normal position shown in Fig. 3. Throughout this particular movement, the geometric action is of the accelerated decrease type, that is, as the axle passes through increments of downward movement, the rate of decrease of the resilient force tending to push said axle downwardly increases. Thus, as the end of the axle moves downwardly from the position shown in Fig. 3 the resilient force tending to push it downwardly decreases at an accelerated rate.

It is to be noted that the links or shackles 40 of the axle spring suspension incline upwardly and inwardly from the offset portion or crank 41 of the crank or eccentric shaft 42 to the axle pivot pin 30. This arrangement has two distinct advantages. One effect of this upward and inward angular shackle arrangement is that it causes the truck at each end of the car body, on which trucks the car body is mounted, to always tend to centralize itself. This centralizing tendency is caused by the effect of gravity which may be considered as a resilient, downwardly acting force acting between the truck and the track bed and operating in a manner identical in its effects to a metal spring connecting the truck and the track bed. It is to be distinctly understood that this force tending to centralize each truck is of a resilient nature. Because of this fact the car body 20 is not subjected to directly connected lateral forces as a consequence of a lateral axle movement. Such a lateral axle movement occurs, for instance, in traversing curves in the track and also when the truck moves horizontally from side to side in centering itself with reference to the track.

In conventional spring suspensions all movements of each axle which are lateral with respect to the truck and car body are transmitted directly to the truck and through links to the car body. Because of the relatively large inertia of the car body and this linkage, such a lateral movement of the axle causes delayed lateral movement of the car body which moves rapidly to one side until it encounters a stop provided on the swivel truck. Because of this delayed lateral movement of the car body the truck is often starting to move in the opposite lateral direction at the time the car body contacts the stop, this resulting in a severe sidewise lurch of the car body. In some conventional railroad car suspensions shock absorbers are incorporated in the suspension to dampen this lurching of the car body but do not, of course, eliminate the cause of this lurching. In the present suspension the axles can move back and forth across the track relative to the truck without any direct effect upon the truck and without any noticeable effect on the car body.

While rail cars do not have the high vertical wheel movements caused by rough roads, heavy lateral thrusts do develop when traveling on rails, due to many other causes. With the present invention all lateral thrusts directed against each axle and wheel assembly are resiliently resisted, excepting those resulting directly from the weight of the axle, wheels and the axle brackets 25. In other words, when a train hits a curve at high speed, the weight of the truck will not produce a hammerlike blow against the wheels when the wheels are suddenly caused to move laterally. The wheels will start to move laterally and when the resiliently applied lateral pressure builds up high enough to turn the truck and to move the car laterally, the truck and car are moved as a result of a resilient force and not that of a hammer blow.

Another important advantage obtained by the angular arrangement of the links or shackles 40 is that it reduces the possibility of wheel tramp. This latter may be broadly defined as a periodic vibration of the axle in a vertical transverse plane, the definition usually being limited to a rotary movement about an axis of rotation located at some point in the axle. In general it may be said that if one wheel is lifted, and if this movement causes a downward thrust on the opposite wheel, then wheel tramp results. Such wheel tramp is prevented in the present invention by insuring that the downward thrust of the axle pivot pin 30 lies at or outside of the vertical plane intersecting the contact of the wheel with the track. It will be noted that by arranging the linkage of the present spring suspension outside of the wheels, the downward thrust of each axle pivot pin 30 is well outside of the track. Therefore the vertical upward thrust against one wheel is opposed by a directly opposite force passing through the corresponding axle pivot pin 30 and hence no downward thrust is imposed upon the opposite wheel.

It will also be seen that by arranging the linkage outside of the wheels of the truck, as shown, the effective spring centers or suspension pivot points are at least 25% of the track width outside of the wheels at each side of the truck. With such wide effective spring centers, the result obtained when one wheel rises a certain distance is that there is a spring deflection which is greater in magnitude. With a conventional truck suspension, with the effective spring centers well within the wheels, when one wheel rises a certain distance there is a spring deflection substantially less than that distance. The suspension of the present invention by virtue of the wide effective spring centers, which permit of the use of softer springs, provides a marked increase in stability and a marked improvement in ride as compared with conventional trucks.

The high and wide suspension pivot positions also eliminates the need for anti-roll devices, such as torsion bar stabilizers and the like. By eliminating these anti-roll controlling means, substantially the same frequencies can be maintained regarding body roll as are developed for vertical movements, thereby to greatly improve the ride characteristics of the suspension. A roll frequency and a vertical frequency of around 70 cycles is desirable for optimum ride conditions. Such a frequency of 70 can be safely incorporated in the suspension by virtue of the high and wide suspension pivot points which permit the use of softer springs and through which the body is more nearly suspended than mounted. Anti-roll stabilizers build up spring rates against body roll and are not a cure, but a crutch, for improperly designed suspensions.

It will also be noted that the spring suspension forming the subject of the present invention does not involve axle compensation, that is, the distribution of the load equally to all of the wheels under all conditions of operation. Axle compensation, while a most valuable feature for heavy highway vehicles, is very undesirable in rail equipment and does not lend for the optimum in stability and ride. While practically all present rail equipment suspensions incorporate axle compensation, in any properly sprung rail vehicle, axle compensation is not necessary or desirable. Axle compensation is undesirable in any vehicle unless the road traveled over is quite irregular—in other words, where one wheel is constantly caused to ride at least an inch or more above its companion wheel which, of course, is not the case on rails.

Axle compensation decreases the stability of empty rail cars because it automatically produces effective spring centers equal to only one-half of the width of the track against instantaneous or sudden upward thrusts of a wheel. In other words, if a wheel suddenly moves upward one inch, assuming no body movement occurs, only one-half inch of spring deflection results. Therefore the resistance to this wheel movement is only one-half inch of spring deflection at a given rate and the energy stored to return said wheel is only that resulting from one-half inch of spring deflection. A greater relative spring deflection is desirable to produce the desired ride and stability and as such spring deflections cannot be obtained with axle compensation, axle compensation is undesirable. Also, such greater spring deflection produces a greater resistance to the wheel and axle displacement.

With the arrangement of the crank 41 of the crank shaft 42, shackles 40 and axle pivot pin 30 as shown, it will be seen that the line of pressure derived from the axle and directed against the crank 41 of the eccentric or crank shaft 42 is able to pass through the axis of rotation of the eccentric or crank shaft 42. In other words, the crank shafts and their shackles are capable of straightening out. This provides a non-bottoming suspension since as the crank shafts and shackles approach the straightened out position the resilient resistance imposed by the torsion rods approaches infinity.

With the present suspension, particularly by the use of the eccentric or crank shaft 42 interposed between the axle bracket and the two part lever arms 90, approximately double the amount of vertical resiliency, as compared with present freight trucks, is provided plus the complete lateral cushioning for the loaded car, the suspension also being non-bottoming in its extreme action both vertically and laterally. By the use of the eccentric or crank shaft 42, the total amount of vertical and lateral body movement is well within present railroad limitations. The maximum vertical travel, as indicated on the graph, Fig. 8, is approximately three and three-quarters inches while the maximum lateral movement is approximately one and one-half inches in each direction. It will further be noted from the graph that when supporting an empty car of approximately 45,000 pounds there is a spring deflection or body movement of approximately one and one-quarter inches. When the car is loaded so that its sprung weight is 157,000 pounds, the spring deflection or body movement rises to two and three-quarters inches. Under maximum shock condition the spring deflection or body movement rises to the maximum of three and three-quarters inches. It will further be noted that under all conditions the unsprung weight remains the same, this being approximately 12,000 pounds per car.

It will also be noted that the truck suspension is so designed that more than one-third of the sprung weight, including the car body and the load, does not pass through the truck frame but is carried through the suspension levers directly to the center plate 12 of the truck. This is due to the fact that the live ends 101 of the torsion rods are journaled in the truck frame immediately adjacent this center plate. The design also reduces the bearing load on the eccentric or crank shaft bearings 45 near the center of the truck on each crank shaft which in turn reduces the friction which should not exceed that required to stabilize the car.

It will also be noted that all brake torque is resisted by the axle brackets, shackles, eccentric or crank shafts, lever arms and their connecting pivots. Thus, by the wide spacing of the bearings 45 for the eccentric or crank shafts 42 and by the wide spacing of the bearings 47 and 32, it will be seen that all brake torque is resisted directly by the linkage which connects each end of each axle with the car body and is not transmitted to the torsion rods 100.

It is also to be noted in the present invention that the means whereby resilience is effected does not involve any frictional resistance, such as occurs in the case of a conventional leaf spring, and hence is free and non-energy absorbing in its action. Also, having no frictional resistance except bearings, which afford no particularly difficult lubrication problems, it does not vary because of change of frictional resistance as in the case of the conventional leaf spring.

The linkage forming the subject of the present invention is so designed that the torsion rods 100 are not subjected to stresses more than one-half their elastic limits and therefore there is little danger of these torsion rods breaking. It will also be noted that by the use of relatively short and heavy torsion rods all complications in their mounting is avoided, the dead end of each torsion rod being merely anchored in an ovalled hole provided in the corresponding end cross beam of the truck frame. Further it will be seen that the live end of each torsion rod is journaled in the truck frame in a very simple and effective manner, each torsion rod merely being formed to provide a cylindrical extension beyond its ovalled part 101 so that the torsion rod can be readily journaled in rubber bushings on opposite sides of its ovalled portion. As previously stated also, the mounting of all of the live ends of these torsion rods immediately adjacent the center plate 12 of the truck frame insures that a very substantial part of the downward force of the car body is carried directly through the center plate to the spring suspension rather than through the truck frame as a whole and then to the suspension.

From the foregoing it will be seen that the present invention provides a torsion rod spring suspension in which all parts of the suspension are contained within a swivel truck and which produces the desirable ride characteristics for a freight car, especially at high speed, and at the same time provides the necessary stability. It will further be seen that the present invention provides a suspension which is light in weight and will function to provide improved ride characteristics with little attention or danger of breakdown.

I claim as my invention:

1. In a spring suspension for carrying the body supporting frame of a railroad car, an axle, a car wheel supporting one end of said axle, a horizontal shaft journaled on said frame adjacent said one end of said axle and arranged outside of the vertical plane of the annular line of contact of said car wheel with the track and above the axis of said axle to extend transversely thereof, a crank fast to said shaft and normally projecting in a generally horizontal direction away from said wheel, a crank arm fast to said shaft and also normally projecting in a generally horizontal direction away from said wheel, a tension shackle connecting said crank with said one end of said axle, and spring means mounted on said frame inside of said vertical plane of the annular line of contact of said car wheel with the track and operatively connected with said crank arm to yieldingly resist vertical movement of said one end of said axle relative to said frame.

2. In a spring suspension for carrying the body supporting frame of a railroad car, an axle, a car wheel supporting one end of said axle, a horizontal shaft arranged outside of the vertical plane of the annular line of contact of said car wheel with the track and adjacent said one end of said axle to extend transversely thereof, a pair of spaced bearings on said frame supporting the opposite ends of said shaft, a crank fast to said shaft and normally projecting in a generally horizontal direction away from said wheel, a crank arm fast to said shaft and also normally projecting in a generally horizontal direction away from said wheel, a tension shackle connecting said crank with said one end of said axle, and spring means mounted on said frame inside of said vertical plane of the annular line of contact of said car wheel with the track and operatively connected with said crank arm to yieldingly resist vertical movement of said one end of said axle relative to said frame.

3. In a spring suspension for carrying the body supporting frame of a railroad car, an axle, a car wheel supporting one end of said axle, a horizontal shaft arranged outside of the vertical plane of the annular line of contact of said car wheel with the track and adjacent said one end of said axle to extend transversely thereof, a pair of spaced ball and socket bearings on said frame supporting the opposite ends of said shaft, a crank fast to said shaft and normally projecting in a generally horizontal direction away from said wheel, a crank arm fast to said shaft and also normally projecting in a generally horizontal direction away from said wheel, a tension shackle connecting said crank with said one end of said axle, and spring means mounted on said frame inside of said vertical plane of the annular line of contact of said car wheel with the track and operatively connected with said crank arm to yieldingly resist vertical movement of said one end of said axle relative to said frame.

4. In a spring suspension for carrying the body supporting frame of a railroad car, an axle, a car wheel supporting one end of said axle, a horizontal shaft arranged outside of the vertical plane of the annular line of contact of said car wheel with the track and adjacent said one end of said axle to extend transversely thereof, a pair of spaced bearings on said frame supporting the opposite ends of said shaft, a crank fast to said shaft and normally projecting in a generally horizontal direction away from said wheel, a pair of spaced, coaxial bearing surfaces on said crank, tension shackle means connecting said bearing surfaces with said one end of said axle, a crank arm fast to said shaft and also normally projecting in a generally horizontal direction away from said wheel, and spring means mounted on said frame inside of said vertical plane of the annular line of contact of said car wheel with the track and operatively connected with said crank arm to yieldingly resist vertical movement of said one end of said axle relative to said frame.

5. In a spring suspension for carrying the body supporting frame of a railroad car, an axle, a car wheel supporting one end of said axle, a horizontal shaft journaled on said frame outside of the vertical plane of the annular line of contact of said car wheel with the track and adjacent said one end of said axle to extend transversely thereof, a crank fast to said shaft and extending in a generally horizontal direction, a tension shackle connecting said crank with said one end of said axle, a crank arm fast to said shaft and extending laterally outward therefrom in the same general direction as said crank, and spring means mounted on said frame inside of said vertical plane of the annular line of contact of said car wheel with the track and operatively connected with said crank arm to yieldingly resist vertical movement of said one end of said axle relative to said frame.

6. In a spring suspension for carrying the body supporting frame of a railroad car, an axle, a car wheel supporting one end of said axle, a horizontal shaft journaled on said frame outside of the vertical plane of the annular line of contact of said car wheel with the track and adjacent said one end of said axle to extend transversely thereof, a crank fast to said shaft and extending in a generally horizontal direction and outwardly relative to said frame, a tension shackle connecting said crank with said one end of said axle, a crank arm fast to said crank shaft and extending laterally outward therefrom in a generally horizontal direction and outwardly relative to said frame, and spring means mounted on said frame inside of said vertical plane of the annular line of contact of said car wheel with the track and operatively connected with said crank arm to yieldingly resist vertical movement of said one end of said axle relatively to said frame.

7. In a spring suspension for carrying the body supporting frame of a railroad car, an axle, a car wheel supporting one end of said axle, a horizontal shaft journaled on said frame adjacent said one end of said axle to extend transversely thereof, said shaft also being arranged outside of the plane of the annular line of contact of said wheel with the railroad track, a crank fast to said shaft, a shackle connecting said crank with said one end of said axle, a crank arm fast to said shaft, a lever arm journaled on said frame inside of the plane of the annular line of contact of said wheel with the railroad track with its free end arranged adjacent said crank arm, a shackle connecting said free end of said lever arm with said crank arm, and means mounted on said frame and yieldingly resisting rotation of said lever arm.

8. In a spring suspension for carrying the body supporting frame of a railroad car, an axle, a car wheel supporting one end of said axle, a horizontal shaft journaled on said frame adjacent said one end of said axle to extend transversely thereof, said shaft also being arranged outside of the plane of the annular line of contact of said wheel with the railroad track, a crank fast to said shaft, a shackle connecting said crank with said one end of said axle said shackle extending upwardly and inwardly from said crank to said axle, a crank arm fast to said shaft, a lever arm journaled on said frame inside of the plane of the annular line of contact of said wheel with the railroad track with its free end arranged adjacent said crank arm, a shackle connecting said free end of said lever arm with said crank arm, and means mounted on said frame and yieldingly resisting rotation of said lever arm.

9. In a spring suspension for carrying the body suporting frame of a railroad car, an axle, a car wheel supporting one end of said axle, a journal box on said one end of said axle and arranged outside of the plane of the annular line of contact of said wheel with the railroad track and having an axle bracket extending upwardly therefrom, a generally horizontal axle pivot carried by said axle bracket and extending transversely of said axle, a horizontal shaft journaled on said frame intermediate said journal box and the upper end of said bracket to extend transversely of said axle, a crank fast to said shaft and extending in a generally horizontal direction, a shackle connecting said crank with said axle pivot, a crank arm fast to said shaft and extending in a generally horizontal direction, a lever arm journaled on said frame inside of the plane of the annular line of contact of said wheel with the railroad track with its free end arranged adjacent said shaft, a shackle connecting said free end of said lever arm with said crank arm, and means mounted on said frame and yieldingly resisting rotation of said lever arm.

10. In a spring suspension for carrying the body supporting frame of a railroad car, an axle, a car wheel supporting one end of said axle, a journal box on said one end of said axle and arranged outside of the plane of the annular line of contact of said wheel with the railroad track and having an axle bracket extending upwardly therefrom, a generally horizontal axle pivot carried by said bracket at its upper end and extending transversely of said axle, a horizontal shaft journaled on said frame intermediate said journal box and the upper end of said bracket to extend transversely of said axle, a crank fast to said shaft and extending upwardly and outwardly therefrom, a shackle connecting said crank with said axle pivot and extending upwardly and inwardly from said crank to said axle pivot, a crank arm fast to said shaft and extending outwardly and downwardly therefrom, a lever arm journaled on said frame inside of the plane of the annular line of contact of said wheel with the railroad track with its free end projecting outside of said plane and adjacent said shaft, a shackle connecting said free end of said lever arm with said crank arm and extending upwardly and outwardly from said lever arm to said crank arm, and means mounted on said frame and yieldingly resisting rotation of said lever arm.

11. In a spring suspension for carrying the body supporting frame of a railroad car, an axle, a car wheel supporting one end of said axle, an axle bracket carried by said one end of said axle, a horizontal crank shaft journaled on said frame adjacent said one end of said axle to extend transversely thereof, an elongated crank formed integrally with said crank shaft and carrying a pair of spaced coaxial bearing surfaces, a crank arm fast to said crank shaft, a lever arm journaled on said frame with its free end arranged adjacent said crank arm, a shackle connecting said free end of said lever arm with said crank arm, means mounted on said frame and yieldingly resisting rotation of said lever arm, and means operatively connecting said crank with the upper extremity of said axle bracket and comprising a shackle having a tubular part embracing said crank and having bearing engagement with said bearing surfaces, said tubular part being provided at its ends with lateral extensions arranged on opposite sides of the upper end of the axle bracket and said lateral extensions and axle bracket being provided with coaxial horizontal bores extending transversely of said axle, a sleeve fitted in the bore of each of said lateral extensions, one of said sleeves being internally threaded and fixed to the corresponding lateral extension and the other being slidable in the bore of the other lateral extension, a pivot pin having a threaded end screwed into said threaded sleeve and its other end welded to the other sleeve, and a bearing bushing interposed between said pivot pin and the bore of said axle bracket.

12. In a spring suspension for carrying the body supporting frame of a railroad car, an axle, a car wheel supporting one end of said axle, a horizontal shaft arranged outside of the vertical plane of the annular line of contact of said car wheel with the track and adjacent one end of said axle to extend transversely thereof, a pair of spaced bearings mounted on said frame and rotatably supporting the opposite ends of said shaft, a crank fast to said shaft intermediate said bearings, tension shackle means connecting the free end of said crank with said one end of said axle, a crank arm fast to one end only of said shaft and arranged to project outwardly therefrom adjacent the corresponding one of said pair of bearings, a lever arm fulcrumed on said frame, a shackle connecting the free end of said lever arm with the free end of said crank arm and means mounted on said frame inside of said vertical plane of the annular line of contact of said car wheel with the track and yieldingly resisting movement of said lever arms.

13. In a spring suspension for carrying the body suporting frame of a railroad car, an axle, a car wheel supporting one end of said axle, a horizontal shaft arranged outside of the vertical plane of the annular line of contact of said car wheel with the track and adjacent one end of said axle to extend transversely thereof, a pair of spaced bearings mounted on said frame and rotatably supporting the opposite ends of said shaft, a crank fast to said shaft intermediate said bearings, tension shackle means connecting the free end of said crank with said one end of said axle, a crank arm fast to one end only of said shaft and arranged to project outwardly therefrom adjacent the corresponding one of said pair of bearings, a lever arm fulcrumed on said frame inside of said vertical plane of the annular line of contact of said car wheel with the track, a resilient shackle connecting the free end of said lever arm with the free end of said crank arm and means mounted on said frame and yieldingly resisting movement of said lever arms.

14. A railroad truck, including a truck frame having a center bearing plate formed integrally therewith, a pair of axles arranged transversely under said truck frame, railroad wheels supporting the ends of said axles, a plurality of vertically swinging lever arms fulcrumed on said truck frame adjacent said center bearing plate and swinging on axes extending transversely of said axles, means operatively connecting the free ends of said lever arms with the corresponding ends of said axles, and means arranged adjacent the fulcrum of each of said lever arms and yieldingly resisting upward movement thereof to yieldingly support said truck frame on said axles and with the upward thrust of said lever arms transmitted substantially directly to said center bearing plate.

15. A railroad truck, including a truck frame having longitudinal side beams, a center bearing plate and central cross beams connecting said center bearing plate with said longitudinal side beams, a pair of axles arranged transversely under said truck frame, railroad wheels supporting the ends of said axles, a plurality of vertically swinging lever arms fulcrumed on said cross beams and projecting horizontally outward from said truck frame, a linkage connecting each end of each of said axles with said truck frame and permitting vertical and axial movement of said axles relative to said frame, means connecting the free end of each of said lever arms with the linkage of the corresponding end of a corresponding axle and means arranged adjacent the fulcrum of each of said lever arms and yieldingly resisting upward movement thereof whereby a large portion of the upward thrust of said lever arms is transmitted substantially directly to said center plate.

16. A railroad truck, including a truck frame having longitudinal side beams, transverse end beams connecting the ends of said longitudinal side beams and a transverse center beam structure connecting the central parts of said longitudinal side beams, a pair of axles arranged transversely under said truck frame, railroad wheels supporting the ends of said axles, a plurality of vertically swinging lever arms having their hubs fulcrumed on said transverse center beam structure and projecting horizontally outward from said truck frame, means operatively connecting the free ends of said lever arms with the corresponding ends of said axles, and a plurality of torsion rods each having its live end secured to the hub of a corresponding lever arm, each of said torsion rods extending parallel with said longitudinal side beams and means anchoring the dead end of each torsion rod in the corresponding transverse end beam of said truck frame.

17. A railroad truck, including a truck frame having longitudinal side beams, transverse end beams connecting the ends of said longitudinal side beams, a center bearing plate, and central cross beams connecting said center bearing plate with said longitudinal side beams, a pair of axles arranged transversely under said truck frame, railroad wheels supporting the ends of said axles, a plurality of vertically swinging lever arms having their hubs fulcrumed on said cross beams and projecting horizontally outward from said truck frame, a linkage connecting each end of each of said axles with said truck frame and permitting vertical and axial movement thereof, means connecting the free end of each of said lever arms with the linkage of the corresponding end of a corresponding axle, a plurality of torsion rods each having its live end secured to the hub of a corresponding lever arm, each of said torsion rods extending parallel with said longitudinal side beams, and means anchoring the dead end of each of said axles in the corresponding transverse end beam of said truck frame.

18. In a spring suspension for carrying the body supporting frame of a railroad car, an axle, a car wheel supporting one end of said axle, a linkage connecting said one end of said axle with said frame and permitting vertical and axial movement of said axle relative to said frame, a vertically swinging lever arm fulcrumed on said frame and projecting horizontally outward, a second lever arm pivoted to the central part of said first lever arm to move vertically about a horizontal axis and forming a continuation of said first lever arm, means connecting the free end of said second lever arm with said linkage, means for resiliently restraining upward movement of said first lever arm, and means adjustably connecting the free end of said first lever arm with an intermediate portion of said second lever arm whereby the effective height of the free end of said second lever arm can be varied.

ALBERT F. HICKMAN.